United States Patent [19]
Williams et al.

[11] Patent Number: 4,815,104
[45] Date of Patent: Mar. 21, 1989

[54] DIGITAL TELECOMMUNICATIONS NETWORK, CROSS-CONNECT MODULE

[75] Inventors: Wayne E. Williams; Bill B. Williams, Jr., both of Otis Orchards; Robert J. Warner, Veradale, all of Wash.

[73] Assignee: Telect, Inc., Spokane, Wash.

[21] Appl. No.: 142,742

[22] Filed: Jan. 11, 1988

[51] Int. Cl.⁴ ............................................. H01R 19/00
[52] U.S. Cl. .................................... 375/36; 200/51.03; 361/390
[58] Field of Search .................. 375/10, 36; 200/51 R, 200/51.03, 51.09; 361/351, 390; 381/123; 370/13, 53; 455/3, 6; 178/63 R; 439/386; 333/101, 105; 379/29

[56] References Cited

U.S. PATENT DOCUMENTS

| | | | |
|---|---|---|---|
| 4,542,372 | 9/1985 | Takach, Jr. | 361/351 |
| 4,682,347 | 7/1987 | Lynch | 379/29 |
| 4,757,163 | 7/1988 | Rabey et al. | 200/51.09 |

OTHER PUBLICATIONS

Product Brochure entitled "DSX-3, DSX-4, Switching Coax Jack and Schematic", by ADC Telecommunications, Inc., Minneapolis, Minnesota, 1986-1987.

Product Brochure entitled "Telect DSX 3/4-2318PJ", by Telect, Inc., Spokane, Washington, 1986-1987.

Primary Examiner—Benedict V. Safourek
Attorney, Agent, or Firm—Wells, St. John & Roberts

[57] ABSTRACT

A digital telecommunication network having a digital cross-connect system is described for facilitating the installation, testing, monitoring, restoration and repair of digital telecommunication apparatus. The system includes a plurality of digital cross-connect modules. Each of the modules has an input jack, an output jack, a cross-connect input jack, a cross-connect output jack, monitor output jack, and monitor input jack mounted on a front panel. Each of the modules has an input switch for cross-connecting an input conductor with a cross-connect input conductor to interconnect the input portion of two items of digital telecommunication apparatus. Each of the modules has an output switch for cross-connecting an output conductor with a cross-connect output conductor to interconnect the output portion of the two items of digital telecommunication apparatus. Each of the switches has means for disengaging the respective conductors when a plug is inserted into a respective jack to isolate the conductor.

10 Claims, 7 Drawing Sheets

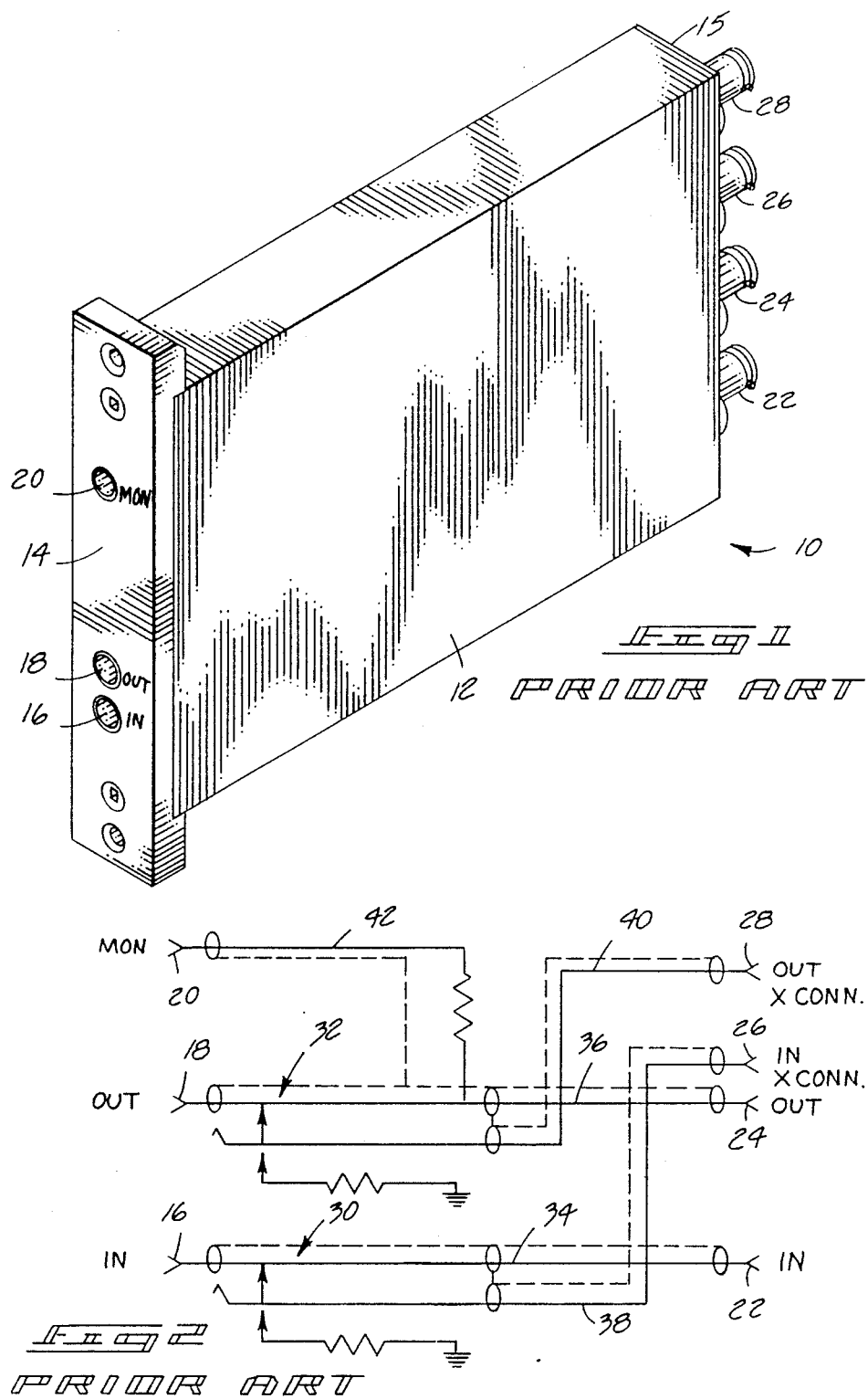

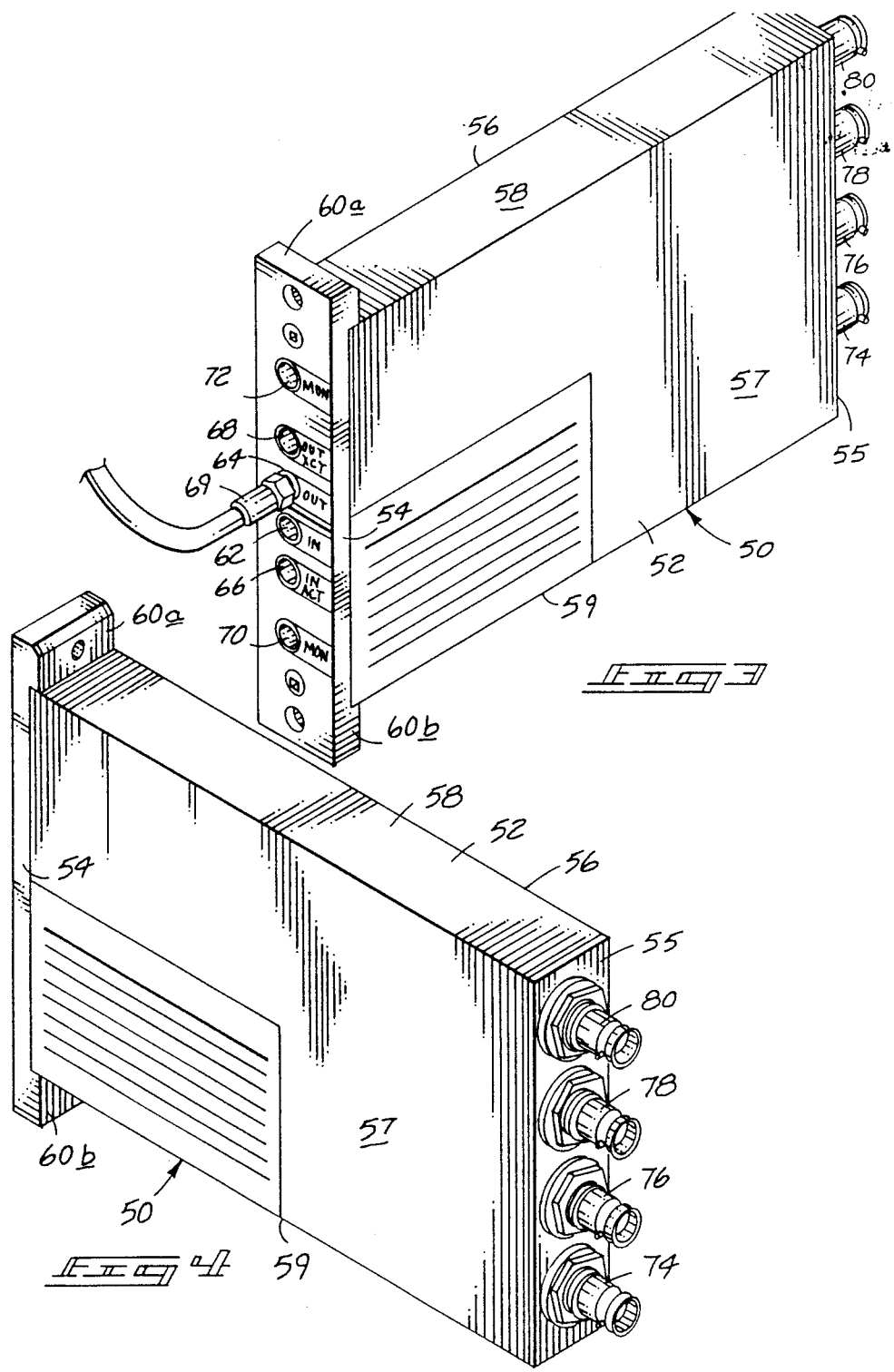

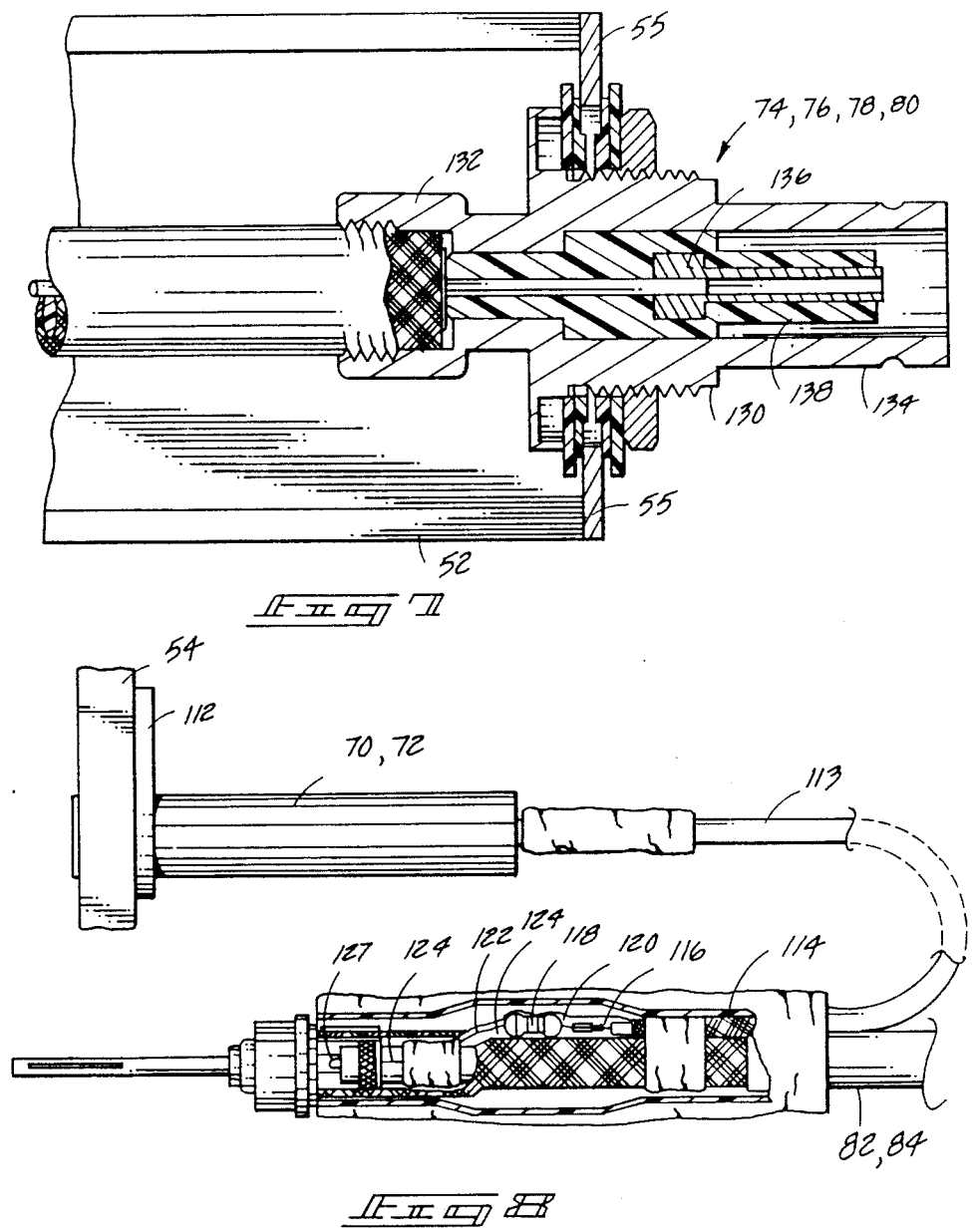

DIGITAL TELECOMMUNICATIONS NETWORK, CROSS-CONNECT MODULE

TECHNICAL FIELD

This invention relates to digital telecommunication networks and more particularly to cross-connect modules for (1) cross-connecting digital telecommunication circuits and for (2) monitoring, testing, restoring and repairing such circuits.

BACKGROUND OF THE INVENTION

Digital signal cross-connect equipment plays a very vital role in the installation, monitoring, testing, restoring and repairing digital telecommunication networks. Digital signal cross-connect modules are frequently used in digital networks to provide a central cross-connect location that is convenient for testing, monitoring, restoring and repairing the digital lines and associated telecommunication equipment. The digital cross-connect modules provide temporary jack access to the digital signals to monitor the signals and to test and repair the digital circuits and equipment. Digital signal cross-connect modules are most frequently used in both large and small telephony central offices, remote sites and customer presmises. It is necessary that with respect to the remainder of the network, the digital signal cross-connect module must appear transparent. This is particularly true and more critical when dealing with digital signals that are transmitting at line rates in excess of 40 million bites per second (Mbps).

Prior to the applicant's invention, the digital signal cross-connect module illustrated in FIGS. 1 and 2 has been utilized. It is helpful in understanding, the applicant's invention to be familiar with the module illustrated in FIGS. 1 and 2. Specifically the module (FIG. 1) is identified generally with the numeral 10 having a case or housing 12. The module 10 includes a front panel 14 that is spaced from a back panel 15. The module 10 has an input jack 16, an output jack 18 and a monitor jack 20 on the front panel for receiving patch cord plugs.

The module 10 includes an input connector 22, and output connector 24, a cross-connect input connector 26 and cross-connect output connector 28 that are all mounted on the back panel 15.

The module 10 (FIG. 2) incldues an input jack switch 30 that is electrically connected to the input jack 16. An output jack switch 32 is electrically connected to the output jack 18. The module 10 includes an internal input coaxial cable 34 that extends from the input jack 16 to the input connector 22. An output coaxial cable 36 extends from the output jack 18 to the output connector 24. A cross-connect branch input coaxial cable 38 extends from the cross-connect input conductor 26 to the input jack switch 30. A cross-connect branch output coaxial cable 40 extends from the cross-connect output connector 28 to the output jack switch 32 as illustrated in FIG. 2. A monitor cable 42 extends from the monitor jack 20 to the output coaxial cable 36 for monitoring the digital signals on the output coaxial cable 36.

Although the module 10 has operated satisfactorily, it has many limitations which are overcome by the applicant's invention. The applicant's invention as described as follows is considered to be more versatile and has many advantages that will become apparent upon reading the following detailed description.

BRIEF DESCRIPTION OF THE DRAWINGS

The preferred embodiment of the invention is illustrated in the accompanying drawings, in which:

FIG. 1 is an illustration of a prior art digital cross-connect module.

FIG. 2 is an electrical circuit schematic of the module of FIG. 1.

Figure 5:
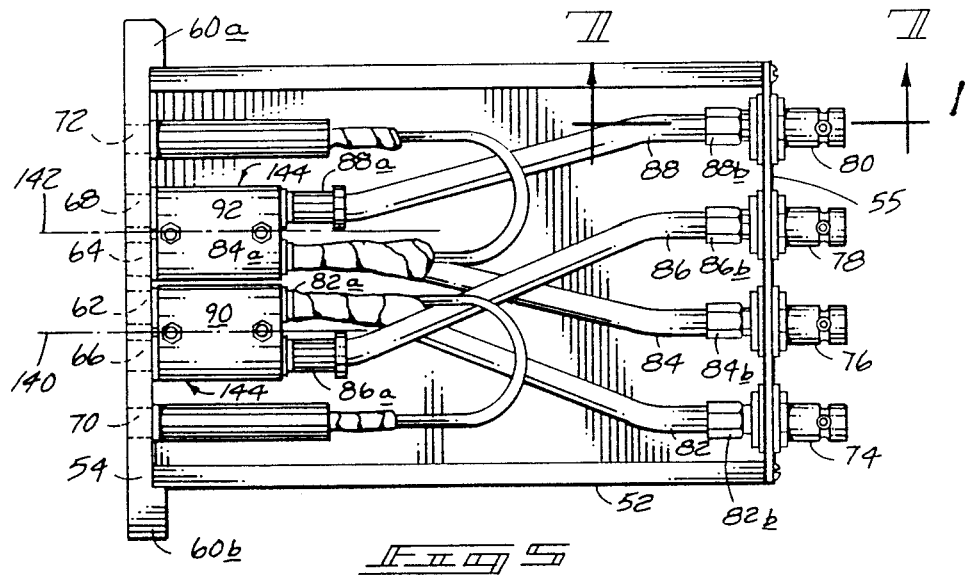
Figure 6:
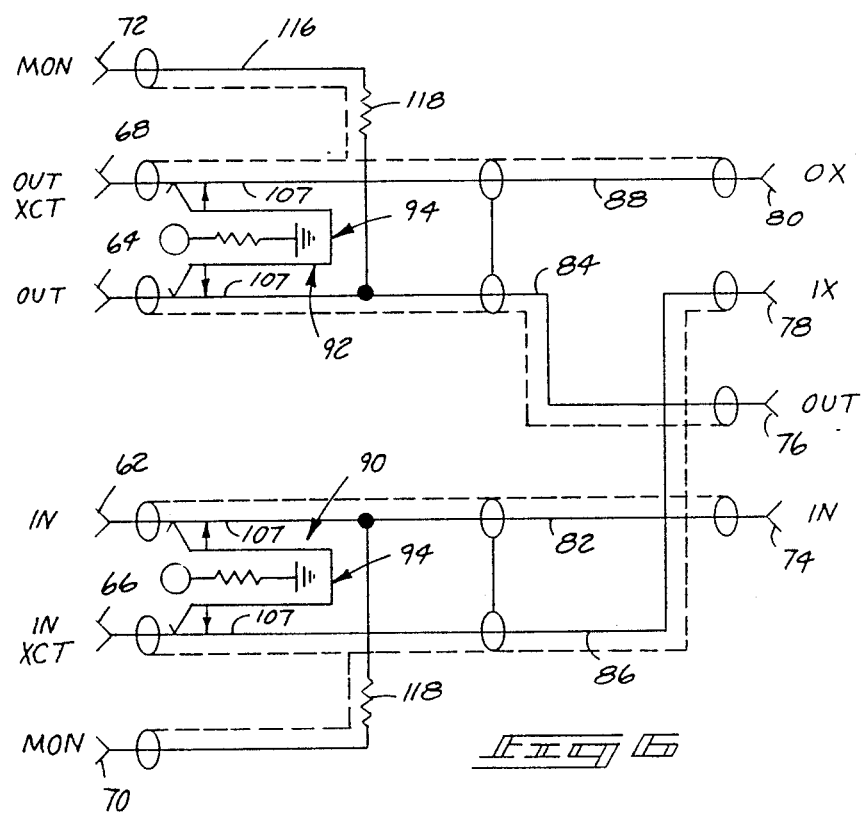
Figure 9:
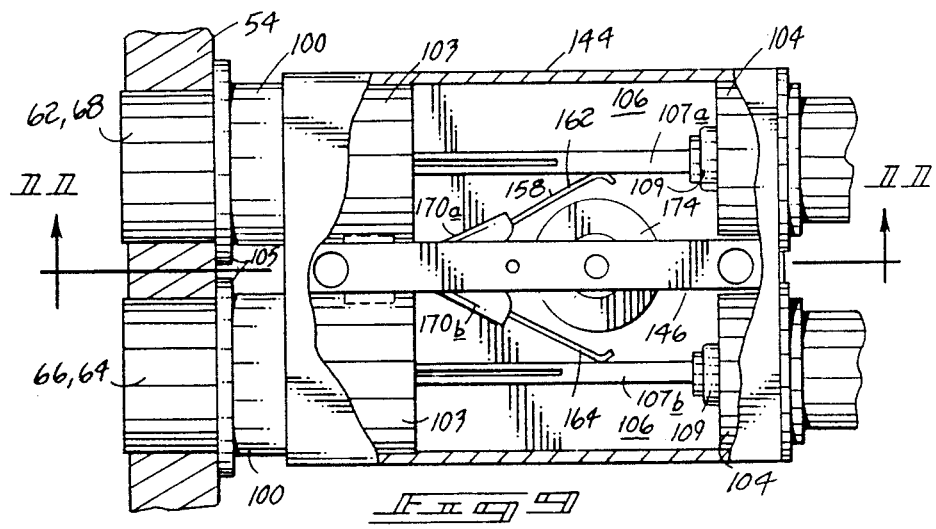
Figure 10:
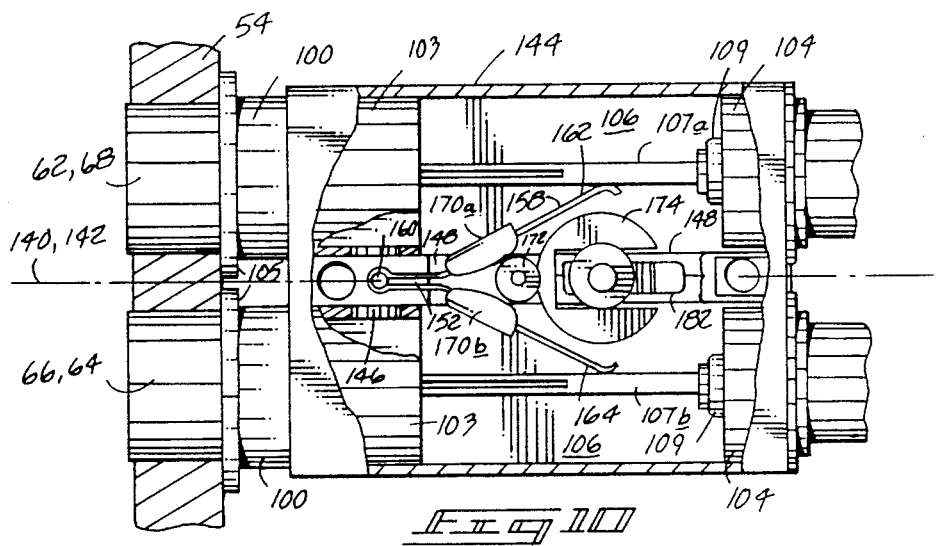
Figure 11:
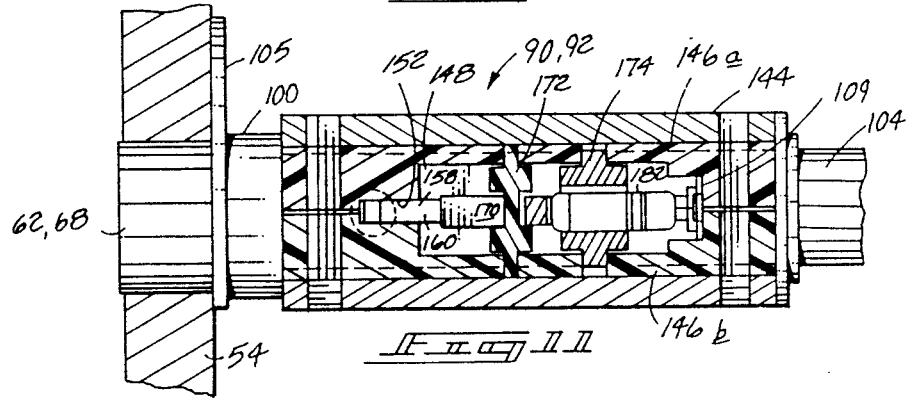
Figure 12:
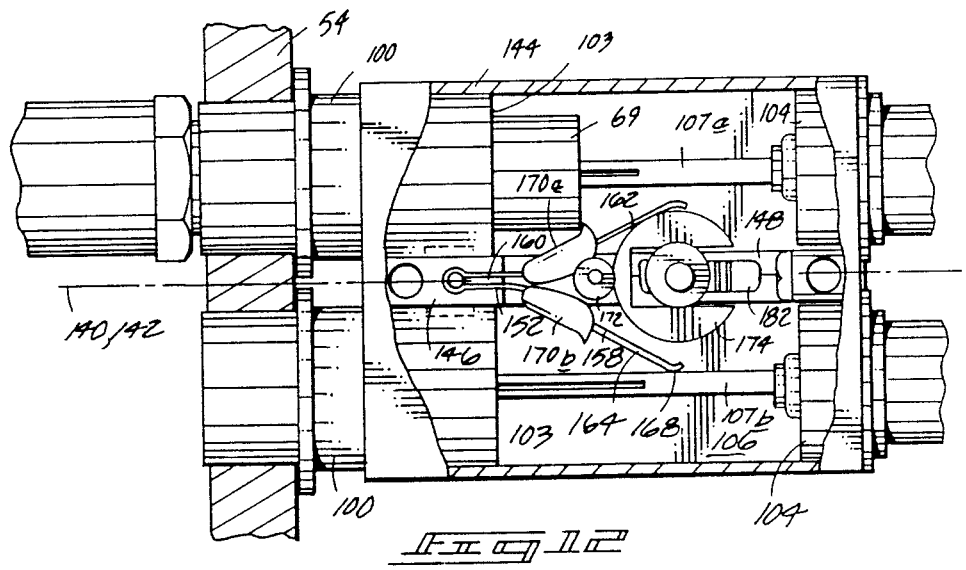
Figure 13:
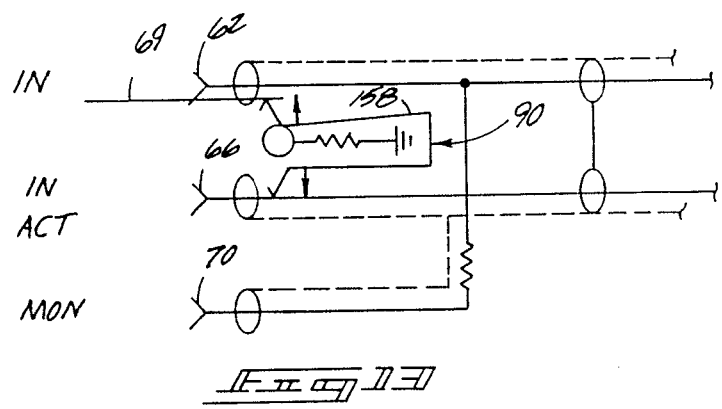
Figure 14:
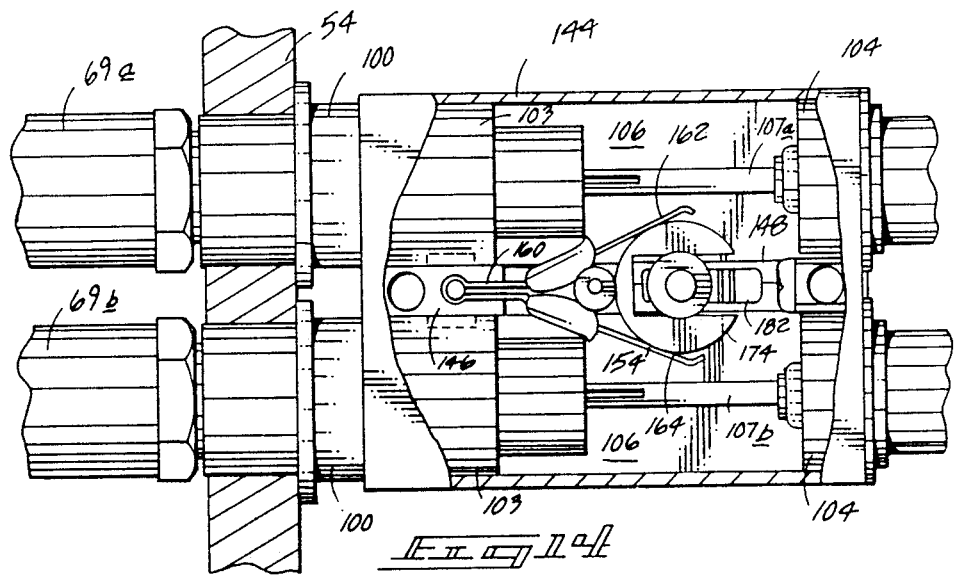
Figure 15:
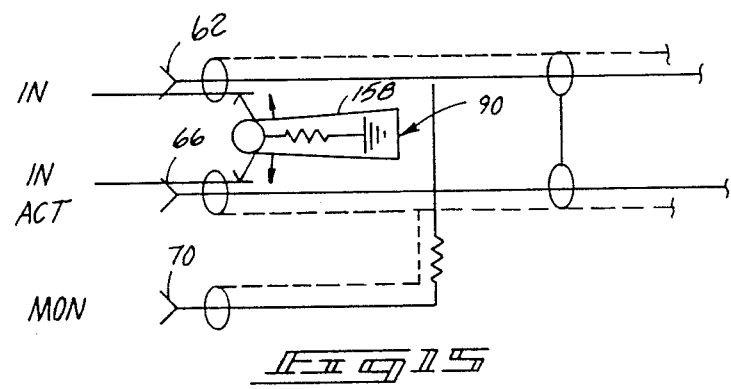

A preferred embodiment of the applicant's invention is illustrated in the following figures, in which:

FIG. 3 is a perspective front view of a preferred embodiment, emphasizing a front panel of the module illustrating the locations of front panel jacks;

FIG. 4 is a rear perspective view of the module illustrated in FIG. 1 which emphasizes coaxial connectors on a back panel of the module;

FIG. 5 is a side view of the module illustrated in FIGS. 3 and 4 with a side panel removed to illustrate the interior of the module housing;

FIG. 6 is an electrical schematic view of the module illustrated in FIGS. 3-5;

FIG. 7 is a cross-sectional view taken along line 7—7 in FIG. 5;

FIG. 8 is a fragmentary side view of a portion of the module illustrating a monitor jack and monitor cable;

FIG. 9 is a fragmentary cross-section of a jack switch incorporated within the module illustrating the switch with two contacts in the closed position;

FIG. 10 is a fragmentary side view similar to FIG. 9 except showing a portion of the switch removed to illustrate a number of internal components;

FIG. 11 is a fragmentary cross-section of view taken along line 11—11 in FIG. 9;

FIG. 12 is a fragmentary side view similar to FIG. 10 except showing one of the contacts in an open, grounded position in response to the insertion of a plug into a respective jack;

FIG. 13 is an electrical schematic of a portion of the module illustrating one switch contact in a closed position and the other in an open, grounded position;

FIG. 14 is a fragmentary side view similar to FIG. 12 except showing the second switch in an open, grounded position; and FIG. 15 is an electrical schematic similar to FIG. 13 except illustrating both switches in an open, grounded position.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

Referring now to the drawings, as illustrated in the FIGS. 3-5, a digital cross-connect module generally designated with the numeral 50 for interconnecting or cross-connecting equipment in a telecommunication network, at a remote location. The module provides a central access location to the equipment for facilitating installation, monitoring, testing, restoration and repair of the telecommunication equipment. A single module 50 generally interconnects two items of telecommunication equipment of the digital telecommunications network in a noncross-connected state. The module 50 is included in a rack or bank of similar modules forming a digital signal cross-connect terminal unit. Most frequently the terminal unit is mounted in bays at a convenient central location in large of small central telephone offices or remote sites or at the customer premises. The module 50 is able to appear transparent to the digital telecommunication network that is capable of transmitting digital information at a high rate in excess of 40 million bits per second (Mbps), particularly DS-3 at 44.736 Mbps and DS-4 at 272.176 Mbps.

The module 50 includes a slender housing or case 52 that is mounted upright as illustrated in FIGS. 3 and 4. The housing 52 provides a RF-EMI shield to prevent RF energy from interfering with the transmission of the digital signals.

The housing 52 (FIG. 3) includes a front panel 54 that is elongated in the vertical dimension and narrow in the horizontal direction. The front panel faces the front of the terminal unit and provides easy access to enable telecommunication transmission engineers, installers and repair personnel to have convenient remote electrical access to the telecommunication circuits and networks. The housing 52 (FIG. 4) includes a back panel 55 that is elongated in the vertical direction and narrow in the horizontal direction to provide a slim profile for the module 50. The back panel faces the rear of the terminal unit and provides limited access. The housing 52 includes side walls 56 and 57 that extend between the front panel 54 and the back panel 55. The housing 52 includes a top wall 58 and a bottom wall 59. The front panel 54 has front panel flanges 60a and 60b that respectively extends upward and downward to facilitate the mounting of the module 50 to the digital signal cross-connect terminal unit or rack. In relatively large and small central telephone offices, the modules 50 are mounted in a plurality of vertical spaced rows forming racks of cross-connect modules.

The module 50 (FIGS. 3 and 6) includes an input jack 62, an output jack 64, a cross-connect input jack 66 and a cross-connect output jack 68. The jacks 62, 64, 66, 68 are mounted in the front panel 54 in a generally horizontal parellel relationship with each of the jacks having an opening to receive a plug 69 of a patch cord or a looping plug which is generally used for the purpose of installation, monitoring, testing, restoring or repairing of the digital telecommunication network circuits (equipment).

In a preferred embodiment, the jacks 62, 64, 66, and 68, as shown in FIG. 3, are evenly spaced with respect to each other at a desired interval commensurate with the axial spacing of a looping plug so that a looping plug may simultaneously be inserted (1) in the input jack 62 and the output jack 64, or (2) in the input jack 62 and the cross-connect input jack 66, or (3) the output jack 64 and the cross-connect output jack 68. The input jack 62 is mounted intermediate and evenly spaced from the output jack 64 and the input cross-connect jack 66. The output jack 64 is positioned intermediate the input jack 62 and the cross-connect output jack 68. More specifically, the input jack 62 is mounted immediately above the cross-connect input jack 66. The output jack 64 is mounted immediately above the input jack 62. The cross-connect output jack 68 is mounted immediately above the output jack 64. The parallel relationship of the jacks 62, 64, 66 and 68 is illustrated more specifically in FIG. 5. An electrical schematic of the module 50 is illustrated in FIG. 6.

The module 50 also includes a bottom input monitoring jack 70 and a top output monitoring jack 72 that are likewise mounted in the front panel 54. The input monitoring jack 70 is preferably mounted below the cross-connect input jack 66. The output monitoring jack 72 is preferably mounted above the cross-connect output jack 68.

The module 50 (FIG. 4) further includes an input connector 74, an output connector 76, a cross-connect input connector 78 and a cross-connect output connector 80. Each of the connectors 74, 76, 78, and 80 are mounted in the back panel 55 as illustrated in FIGS. 4 and 5. The connectors 74, 76, 78 and 80 are preferably BNC or TNC coaxial connectors frequently referred to as installer connectors. The connectors 74, 76, 78 and 80 are respectively connected to the digital signal lines or equipment in which the input connector 74 is connected to a digital signal input portion of a first line or first item of equipment of a telecommunication network (not shown). The output connector 76 is connected to the output portion of the first line or unit of equipment (not shown). The cross-connect input connector 78 is connected to the input portion of a second line or second piece of telecommunication equipment (not shown). The cross-connect output connector 80 is connected to an output portion of the second line or piece of telecommunication equipment (not shown). Coaxial cables (not shown) are most frequently used to connect the telecommunication equipment to the module connectors 74, 76, 78 and 80. Frequently the coaxial cables are placed and supported in trays that extend generally horizontally along the back panels 55.

Generally once the connectors 74, 76, 78 and 80 are hooked up it is seldom that they are disconnected. For the purpose of this invention, it will be considered that the connectors 74, 76, 78 and 80 are of a permanent connection although it is recognized that the connectors 74, 76, 78 and 80 may be disconnected from the telecommunication equipment when the equipment is rearranged, disassembled and the like.

The module 50 (FIGS. 5 and 6) further includes an input coaxial conductor 82, an output coaxial conductor 84, a cross-connect input conductor 86 and a cross-connect output conductor 88. The input coaxial conductor 82 has ends 82a and 82b that permanently interconnect the input coaxial conductor 82 between the input jack 62 and the input connector 74. The output coaxial conductor 84 has one end 84a permanently connected to the output jack 64 and the other end 84b is permanently connected to the output connector 76. The cross-connect input conductor 86 has end 86a permanently connected to the cross-connect input jack 66 and another end 86b permanently connected to the cross-connect input connector 78. The cross-connect output conductor 88 has end 88a permanently connected to the cross-connect output jack 68 and another end 88b permanently connected to the cross-connect output connector 80.

The module 50 (FIGS. 5 and 6) further includes an input switch assembly 90 an an output switch assembly 92. Each of the switch assemblies are aligned along parallel axes as illustrated in FIG. 5. As illustrated schematically in FIG. 6, each of the switch assemblies 90, 92 include a unitary conductive bridge member generally designated with the numeral 94 for normally cross-connecting conductor 82 with conductor 86 and cross-connecting output coaxial conductor 84 with cross-connect coaxial output conductor 88, respectively. When a plug 69 is inserted into any one of the jacks 62, 64, 66 or 68, the associated switch, in response to such insertion, disconnects the respective conductor 82, 84, 86 or 88 to isolate the conductor and associated equipment from the cross-connect circuit. The switch assemblies 90, 92 will be explained in more detail in the following paragraphs.

Each of the jacks 62, 64, 66 and 68 (FIGS. 9-12) includes a hollow or peripheral outer cylinder 100 for receiving a barrel of the plug 69 therein. Each of such jacks has an open forward end or plug entry sleeve 103 that is mounted in the front panel 54 for receiving a plug. Each jack has a closed rear end 104 that is connected to a respective coaxial conductor. A flange 105 is affixed on the forward end 103 for mounting the jack firmly to the front panel 54. Each of such jacks has a central cavity 106 for receiving a plug 69. Each of such jacks has a central or axial conductor member 107 that projects forward from the rear end 103 for receiving a plug pin. The central conductor member 107 is supported in a central insulative support 109 at the rear end 103.

Each of the input and output monitoring jacks 70 and 72 (FIG. 8) include a flange 112 that mounts the monitoring jack to the front panel 54. A separate monitoring coaxial cable 113 extends from each of the monitoring jacks 70, 72 to the input coaxial conductor 82 or output coaxial conductor 84, illustrated schematically in FIG. 6. The cable 113 includes an outer coaxial conductor 114 that engages and is in contact with an outer conductor of the coaxial conductors 82 or 84. Each of the monitoring coaxial cables 113 (FIG. 8) includes an inner conductor 116 that is connected in series to an isolation resistor 118. One lead 120 of the resistor 118 is connected to the inner conductor 116 and another end 122 is connected to a central conductor of the coaxial conductors 82 or 84. The lead 122 extends through an aperture 124 formed in the outer braided portion of the coaxial cable. The other lead 122 then extends through a slit 124 formed in the coaxial insulator. The terminal end of lead 122 is affixed to the inner conductor by spot weld 127.

As illustrated in FIG. 7, each of the four connectors 74, 76, 78 and 80 includes a threaded housing 130 that extends from a rear end 132 to a forward end 134 projecting from the back panel 55. Each of the connectors has a central metal female sleeve 136 that is supported by a rather cylindrical block 138 within the housing 130.

Referring to FIG. 5, input switch assembly 90 has a switch axis 140 and output switch assembly 92 has a switch axis 142. Each of the switch assemblies 90, 92 have a unifying housing 144 (FIGS. 5, 9-12) that encircles the outer cylinder 100 of two of the jacks 62 and 66 or 68 and 64. Each of the housings 144 has an interior insulative support block 146 mounted therein in which the support block is illustrated in FIG. 11 having upper and lower symmetrical block parts 146a and 146b that form a central cavity 148 therein. The cavity 148 (FIG. 10) has a side opening facing central conductor 107a of one of the two jacks and a second opening facing the other central conductor 107b of the other jack. The insulative support block 146 fits in a receiving slot 152 that is aligned along the switch assembly axis.

Each of the switch bridge members 94 (FIG. 6) includes a unitary, generally V-shaped, conductive spring 158 that has an apex 160 that is mounted in the receiving slot 152. The V-shaped conductive spring 158 has a contact arm 162 that extends outward from one side of the cavity 148 to contact conductor 107a and a contact arm 164 that extends outward from the other side of the cavity 148 to contact conductor 107b. Each of the contact arms 162, 164 extends outward from the apex 160 to a curved end.

Each of the bridge members 94 (FIG. 9) includes a insulative bumper 170a and 170b mounted on respective switch arms 162, 164 for receiving and being engaged by the end of the plug 69, as illustrated in FIG. 12, for deflecting the respective contact arm 162, 164 away from the central conductor 107a, 107b to disconnect the associated equipment from the cross-connect circuit. The contact arms 162, 164 are biased outward for normally engaging the central conductor 107a, 107b and are deflected from such normal engagement or contact by the insertion of the plug 69.

An arm stop 172 (FIGS. 10-12) is mounted within the central cavity 148 and aligned on the switch axis. The arm stop 172, as illustrated in FIGS. 12, limits the inward movement of the contact arm 162 or 164 when a plug 69 is inserted into a respective jack. The arm stop 172 prevents overtravel of the arms 162, 164. The arm stop 172 is engaged by the insulative bumper 170a and 170b.

The switch assembly further includes a grounding post 174 that is mounted in the central cavity 148 aligned along the switch housing axis. The grounding post 174 includes a contact button body that has an arcuate surface that is engaged by the contact arms 162, 164 as illustrated in FIG. 12 when a plug is inserted into a respective jack. The arcuate surface of the grounding post 174 is capable of engaging one or both of the arms should plugs 69 be inserted in both of the respective jacks (FIG. 14).

The grounding post 174 (FIGS. 11 & 12) has a cavity formed therein receiving a grounding resistor 182. The grounding resistor 182 is positioned along the axis of the switch assembly. One lead of the grounding resistor 182 is connected to the grounding post 174 and the opposite lead is connected to the switch housing for grounding the grounding post 174.

It should be noted that the module 50 enables monitoring of either the input signals or output signals or both, via the monitoring jacks 70 and 72 (FIGS. 3 & 5) without interfering with signals on the respective lines.

Furthermore, it should be appreciated that the module 50 enables the installer, tester, monitor or repair person to utilize a patch cord to isolate any one of conductors 74, 76, 78 and 80 and reroute the line temporarily to connect at a different module. The module 50 greatly increases the ability of the transmission engineer and his staff to detect problems or abnormalities and to isolate the abnormality and to make a proper repair. Furthermore, the module 50 provides a cross-connection capability at the front panel. Furthermore, it enables looping plugs to be utilized for testing the circuits by rerouting the circuits directly from the front panel. Furthermore, the module 50 has a unique switch structure that reduces the amount of digital information that is lost in transition from a cross-connect condition to a patch condition. It is found that the module 50 enables the restoration of jack service in less than five seconds.

In compliance with the statue, the invention has been described in language more of less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. In a digital telecommunication network having the capability of transmitting digital signals at speeds in excess of 40 million bites per second (Mbps), a digital signal cross-connect terminal unit having a plurality of digital cross-connect modules for interconnecting various digital telecommunication apparatus within the network and for providing a central access point for monitoring, testing, and temporarily reconnecting the various digital telecommunication apparatus; in which one or more of the modules in such terminal unit comprises:

(a) a compact, self-contained module housing having (1) a front panel, and (2) a back panel spaced a desired distance from the front panel;

(b) at least four coaxial jacks mounted to the front panel for separately receiving electrical plugs, such as patch cord plugs and looping plugs, and defining an input jack, an output jack, a cross-connect input jack, and a cross-connect output jack;

(c) at least four coaxial cable connectors mounted to the rear panel defining (1) an input connector normally connected through a coaxial cable to a signal input portion of one telecommunication apparatus, (2) an output connector normally connected through a coaxial cable to the signal output portion of the one telecommunication apparatus, (3) a cross-connect input connector normally connected through a coaxial cable to a signal input portion of a second telecommunication apparatus, and (4) a cross-connect output connector normally connected through a coaxial cable to a signal output portion of the second telecommunication apparatus;

(d) a coaxial input conductor extending between the front and back panels having one end permanently connected to the input jack and an opposite end permanently connected to the input connector;

(e) a coaxial output conductor extending between the front and back panels having one end permanently connected to the output jack and an opposite end permanently connected to the output connector;

(f) a coaxial cross-connect input conductor extending between the front and back panels having one end permanently connected to the cross-connect input jack and opposite end permanently connected to the cross-connect input connector;

(g) a coaxial cross-connect output conductor extending between the front and back panels having one end permanently connected to the cross-connect output jack and an opposite end permanently connected to the cross-connect output connector;

(h) an input jack switch mounted internally within the module housing, (1) for electrically bridging the input conductor and the cross-connect input conductor to interconnect the signal input portion of the first and second telecommunication apparatus, when a plug is absent from both the input jack and the cross-connect input jack; and (2) for isolating the input conductor or the cross-connect input conductor from the other, when a plug is inserted into the respective jack; and (i) an output jack switch mounted internally within the module housing (1) for electrically bridging the output conductor and the cross-connect output conductor to interconnect the signal output portions of the first and second telecommunication apparatus, when a plug is absent from both the output jack and the cross-connect output jack; and (2) for isolating the output conductor or the cross-connect output conductor from the other, when a plug is inserted in the respective jack.

2. In the digital telecommunication network as defined in claim 1, further comprising:

an input monitoring jack mounted to the front panel for receiving an input monitoring plug;

an input monitoring cable interconnecting the input monitoring jack and the input conductor for monitoring digital signals on the input conductor without interfering with the digital signals when the input monitoring plug is inserted into the input monitor monitoring jack;

an output monitoring jack mounted to the front panel for receiving an input monitoring plug;

an output monitoring cable interconnecting the output monitoring jack and the output conductor for monitoring the digital signals on the output conductor without interfering with the digital signals when the output monitoring plug is inserted into the output monitoring jack.

3. In the digital telecommunication network as defined in claim 1 wherein the module has the cross-connect input jack located immediately adjacent the input jack.

4. In the digital telecommunication network as defined in claim 1 wherein the module has the output jack immediately adjacent to the input jack and spaced a distance sufficient to enable a looping plug to be inserted simultaneously into the input jack and the output jack to interconnect the input conductor and the output conductor at the front panel.

5. In the digital telecommunication network as defined in claim 4 wherein the module has the cross-connect input jack positioned immediately adjacent the input jack and has the cross-connect output jack positioned immediately adjacent to the output jack and wherein each of the jacks are evenly spaced with respect to its adjacent jack.

6. In the digital telecommunication network defined in claim 1 wherein the module has an input jack assembly which includes the input jack and the cross-connect input jack and an input jack housing enclosing the input jack switch; and an output jack assembly which includes the output jack and the cross-connect output jack and an output housing enclosing the output jack switch.

7. In the digital telecommunications network as defined in claim 1 wherein each of the jack switches includes;

a switch housing;

a unitary conductive bridge member that is biased to normally engage two of the connectors to electrically bridge the conductors when a plug is absent from both of the respective jacks and for disengaging with one of the conductors when the plug is inserted into a respective jack to electrically isolate the disengaged conductor to provide front panel access to each of the jacks to enable temporary interconnection between any two of the jacks via looping plugs or cords.

8. In the digital telecommunications network as defined in claim 7 wherein the unitary conductive bridge member is generally V-shaped and is mounted between the two conductors having a first arm biased outward normally engaging one conductor and a second arm biased outward normally engaging the second conductor.

9. In the digital telecommunications network as defined in claim 8 wherein each of the jack switches further includes a grounding post between the first and second arms for electrically grounding the unitary conductive bridge member when a plug is inserted into one of the jacks.

10. In the digital telecommunications network as defined in claim 9 wherein the grounding post has a cavity formed therein; and a grounding resistor at least partially mounted within the cavity having one terminal fixed to the grounding post and a second terminal affixed to the switch housing.

* * * * *

UNITED STATES PATENT AND TRADEMARK OFFICE
CERTIFICATE OF CORRECTION

PATENT NO. : 4,815,104
DATED      : March 21, 1989
INVENTOR(S): Wayne E. Williams, et al It is certified that error appears in the above-indentified patent and that said Letters Patent is hereby corrected as shown below:

Col. 1, Line 27, delete "presmises" and insert therefor --premises--.

Col. 1, Line 32, delete "bites" and insert therefor --bits--.

Col. 6, Line 61, delete "statue" and insert therefor --statute--.

Col. 6, Line 62, delete "of" and insert therefor --for--.
Column 7,
Claim 1, Line 3, delete "bites" and insert therefor --bits--.

Signed and Sealed this

Twenty-ninth Day of November, 1994

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : B1-4,815,104
DATED : March 21, 1989
INVENTOR(S) : Wayne E. Williams et al It is certified that error appears in the above-indentified patent and that said Letters Patent is hereby corrected as shown below:

Column 5, Lines 34-37, italicize "a coaxial input conductor extending between the front and back panels having one end permanently connected to the input jack and an opposite end permanently connected to the input connector;"

Column 6., Lines 26-29, italicize "-connect input connector normally connected through a coaxial cable to a signal input portion of a second telecommunication apparatus, and"

Column 6, Lines 37-40, italicize "a coaxial output connector extending between the front and back panels having one end permanently connected to the output jack and an opposite end permanently connected to the output connector;"

Column 6, Lines 60 and 61, italicize "an output jack switch mounted internally within the module housing"

Column 1, Line 3, delete "*bites*" and insert therefor --bits--

Column 2, Line 4, delete "*bites*" and insert therefor --*bits*--

UNITED STATES PATENT AND TRADEMARK OFFICE
CERTIFICATE OF CORRECTION

PATENT NO. : B1-4,815,104
DATED : March 21, 1989
INVENTOR(S) : Wayne E. Williams It is certified that error appears in the above-indentified patent and that said Letters Patent is hereby corrected as shown below:

Column 3, Line 4, delete "*bites*" and insert therefor --*bits*--

Column 3, Line 16, delete "*speed*" and insert therefor --*spaced*--

Column 4, Line 4, delete "*bites*" and insert therefor --*bits*--

Column 4, Line 3, delete "*bites*" and insert therefor --*bits*--

Signed and Sealed this

Sixth Day of December, 1994

Attest:

BRUCE LEHMAN

*Attesting Officer*         *Commissioner of Patents and Trademarks*

REEXAMINATION CERTIFICATE (1502nd)
United States Patent [19]
Williams et al.

[11] B1 4,815,104
[45] Certificate Issued Jul. 2, 1991

[54] DIGITAL TELECOMMUNICATIONS NETWORK, CROSS-CONNECT MODULE

[75] Inventors: Wayne E. Williams; Bill B. Williams, Jr., both of Otis Orchards; Robert J. Warner, Versdale, all of Wash.

[73] Assignee: Telect, Inc. Telect Inc., Liberty Lake, Wash.

Reexamination Request:
No. 90/002,034, May 29, 1990

Reexamination Certificate for:
Patent No.: 4,815,104
Issued: Mar. 21, 1989
Appl. No.: 142,742
Filed: Jan. 11, 1988

[51] Int. Cl.⁵ .................. H01R 19/00; H01P 1/10
[52] U.S. Cl. ............................. 375/36; 178/1; 178/2; 178/74; 200/51.03; 200/153 S; 333/105; 333/124; 333/262; 361/390
[58] Field of Search ................. 333/105, 124, 262; 178/1 R, 2 R, 74; 370/58; 375/36; 200/51.03, 153 S; 361/390

[56] References Cited
U.S. PATENT DOCUMENTS
4,670,626  6/1987  Fisher et al. .................... 178/1
4,749,968  6/1988  Burroughs ...................... 333/105

OTHER PUBLICATIONS
ADC Telecommunications, Inc., "DSX Digital Signal Cross–Connect", pp. 1–3 and 63–65, 68, 71, 1986.

*Primary Examiner*—Benedict V. Safourek

[57] ABSTRACT

A digital telecommunication network having a digital cross-connect system is described for facilitating the installation, testing, monitoring, restoration and repair of digital telecommunication apparatus. The system includes a plurality of digital cross-connect modules. Each of the modules has an input jack, an output jack, a cross-connect input jack, a cross-connect output jack, monitor output jack, and monitor input jack mounted on a front panel. Each of the modules has an input switch for cross-connecting an input conductor with a cross-connect input conductor to interconnect the input portion of two items of digital telecommunication apparatus. Each of the modules has an output switch for cross-connecting an output conductor with a cross-connect output conductor to interconnect the output portion of the two items of digital telecommunication apparatus. Each of the switches has means for disengaging the respective conductors when a plug is inserted into a respective jack to isolate the conductor.

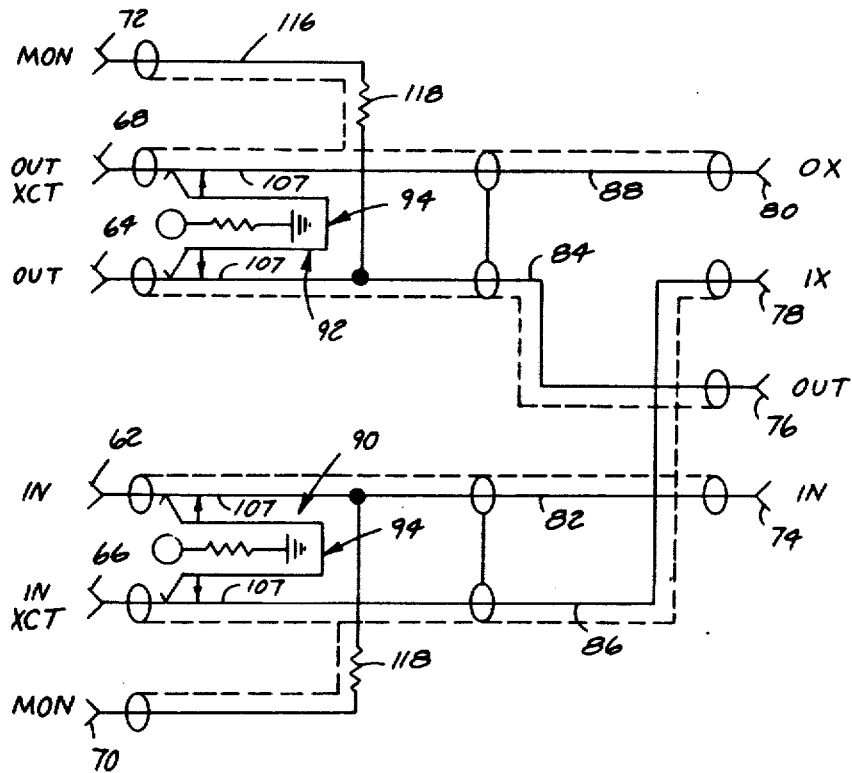

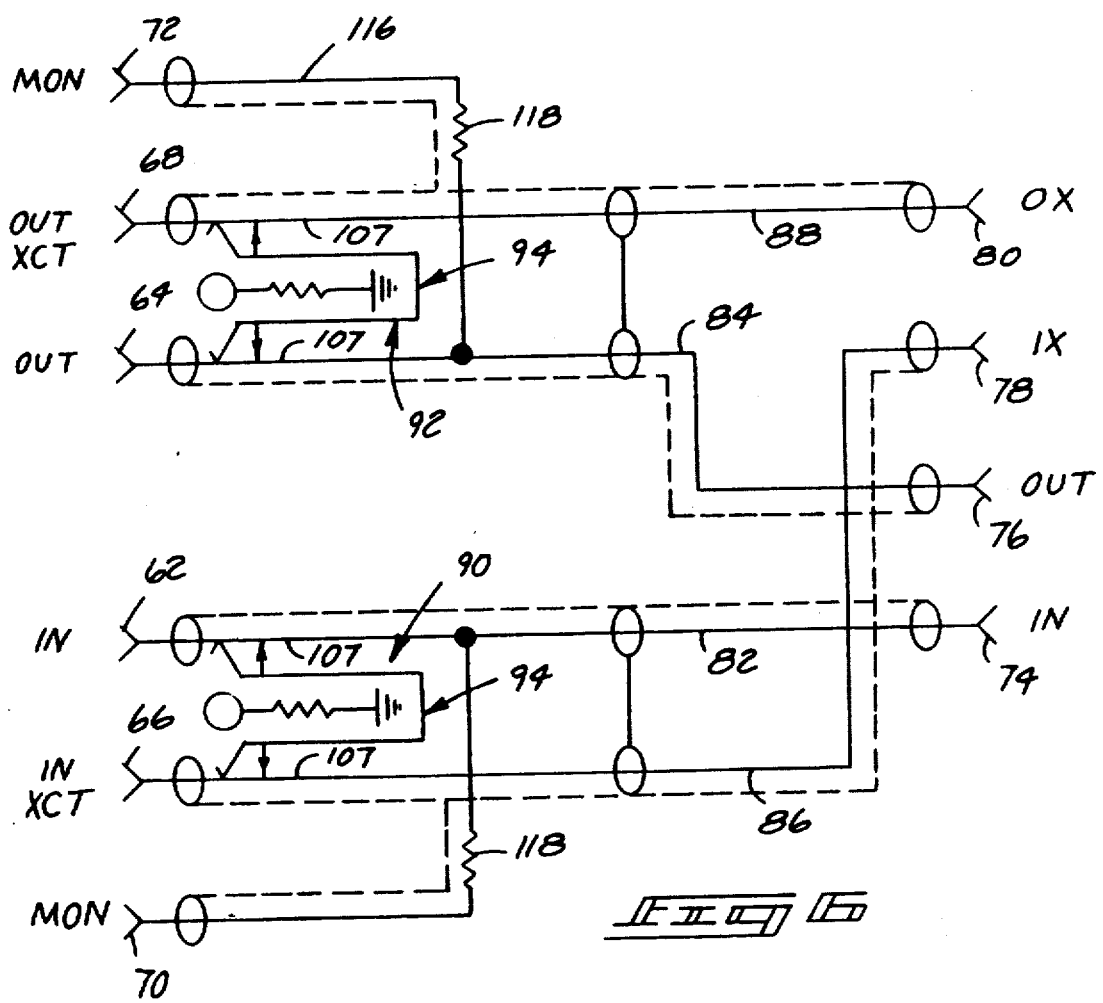

1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-4 are determined to be patentable as amended.

Claims 5-10, dependent on an amended claim, are determined to be patentable.

New claims 11-14 are added and determined to be patentable.

1. In a digital telecommunication network having the capability of transmitting digital signals at speeds in excess of 40 million bites per second (Mbps), a digital signal cross-connect terminal unit having a plurality of digital cross-connect modules for interconnecting various digital telecommunication apparatus within the network and for providing a central access point for monitoring, testing, and temporarily reconnecting the various digital telecommunication apparatus; in which one or more of the modules in such terminal unit comprises:
   (a) a compact, self-contained module housing having (1) [a] *an elongated* front panel, and (2) a back panel spaced a desired distance from the front panel;
   (b) at least four coaxial jacks mounted to the front panel *at spaced intervals in the elongated direction* for separately receiving electrical plugs, such as patch cord plugs and looping plugs, and defining an input jack, an output jack, a cross-connect input jack, and a cross-connect output jack;
   (c) at least four coaxial cable connectors mounted to the rear panel defining (1) an input connector normally connected through a coaxial cable to a signal input portion of one telecommunication apparatus, (2) an output connector normally connected through a coaxial cable to the signal output portion of the one telecommunication apparatus, (3) a cross-connect input connector normally connected through a coaxial cable to a signal input portion of a second telecommunication apparatus, and (4) a cross-connect output connector normally connected through a coaxial cable to a signal output portion of the second telecommunication apparatus;
   (d) a coaxial input conductor extending between the front and back panels having one end permanently connected to the input jack and an opposite end permanently connected to the input connector;
   (e) a coaxial output conductor extending between the front and back panels having one end permanently connected to the output jack and an opposite end permanently connected to the output connector;
   (f) a coaxial cross-connect input conductor extending between the front and back panels having one end permanently connected to the cross-connect input jack and opposite end permanently connected to the cross-connect input connector;
   (g) a coaxial cross-connect output conductor extending between the front and back panels having one end permanently connected to the cross-connect output jack and an opposite end permanently connected to the cross-connect output connector;
   (h) an input jack switch mounted internally within the module housing, (1) for electrically bridging the input conductor and the cross-connect input conductor to interconnect the signal input portion of the first and second telecommunication apparatus, when a plug is absent from both the input jack and the cross-connect input jack; and (2) for isolating the input conductor or the cross-connect input conductor from the other, when a plug is inserted into the respective jack; and
   (i) an output jack switch mounted internally within the module housing (1) for electrically bridging the output conductor and the cross-connect output conductor to interconnect the signal output portions of the first and second telecommunication apparatus, when a plug is absent from both the output jack and the cross-connect output jack; and (2) for isolating the output conductor or the cross-connect output conductor from the other, when a plug is inserted in the respective jack.

2. [In the digital telecommunication network as defined in claim 1, further comprising:] *In a digital telecommunication network having the capability of transmitting digital signals at speeds in excess of 40 million bites per second (Mbps), a digital signal cross-connect terminal unit having a plurality of digital cross-connect modules for interconnecting various digital telecommunication apparatus within the network and for providing a central access point for monitoring, testing, and temporarily reconnecting the various digital telecommunication apparatus; in which one or more of the modules in such terminal unit comprises:*
   *(a) a compact, self-contained module housing having (1) an elongated front panel, and (2) a back panel spaced a desired distance from the front panel;*
   *(b) at least four coaxial jacks mounted to the front panel at spaced intervals in the elongated direction for separately receiving electrical plugs, such as patch cord plugs and looping plugs, and defining an input jack, an output jack, a cross-connect input jack, and a cross-connect output jack;*
   *(c) at least four coaxial cable connectors mounted to the rear panel defining (1) an input connector normally connected through a coaxial cable to a signal input portion of one telecommunication apparatus, (2) an output connector normally connected through a coaxial cable to the signal output portion of the one telecommunication apparatus, (3) the cross-connect input connector normally connected through a coaxial cable to a signal input portion of a second telecommunication apparatus, and (4) a cross-connect output connector normally connected through a coaxial cable to a signal output portion of the second telecommunication apparatus;*
   *(d) a coaxial input conductor extending between the front and back panels having one end permanently connected to the input jack and an opposite end permanently connected to the input connector;*

(e) a coaxial output conductor extending between the front and back panels having one end permanently connected to the output jack and an opposite end permanently connected to the output connector;

(f) a coaxial cross-connect input conductor extending between the front and back panels having one end permanently connected to the cross-connect input jack and opposite end permanently connected to the cross-connect input connector;

(g) a coaxial cross-connect output conductor extending between the front and back panels having one end permanently connected to the cross-connect output jack and an opposite end permanently connected to the cross-connect output connector;

(h) an input jack switch mounted internally within the module housing, (1) for electrically bridging the input conductor and the cross-connect input conductor to interconnect the signal input portion of the first and second telecommunication apparatus, when a plug is absent from both the input jack and the cross-connect input jack, and (2) for isolating the input conductor or the cross-connect input conductor from the other, when a plug is inserted into the respective jack;

(i) an output jack switch mounted internally within the module housing (1) for electrically bridging the output conductor and the cross-connect output conductor to interconnect the signal output portions of the first and second telecommunication apparatus, when a plug is absent from both the output jack and the cross-connect output jack, and (2) for isolating the output conductor or the cross-connect output conductor from the other, when a plug is inserted in the respective jack;

(j) an input monitoring jack mounted to the front panel for receiving an input monitoring plug;

(k) an input monitoring cable interconnecting the input monitoring jack and the input conductor for monitoring digital signals on the input conductor without interfering with the digital signals when the input monitoring plug is inserted into the input monitor monitoring jack;

(l) an output monitoring jack mounted to the front panel for receiving an input monitoring plug; and (m) an output monitoring cable interconnecting the output monitoring jack and the output conductor for monitoring the digital signals on the output conductor without interfering with the digital signals when the output monitoring plug is inserted into the output monitoring jack.

3. [In the digital telecommunication network as defined in claim 1] *In a digital telecommunication network having the capability of transmitting digital signals at speeds in excess of 40 million bites per second (Mbps), a digital signal cross-connect terminal unit having a plurality of digital cross-connect modules for interconnecting various digital telecommunication apparatus within the network and for providing a central access point for monitoring, testing, and temporarily reconnecting the various digital telecommunication apparatus; in which one or more of the modules in such terminal unit comprises:*

(a) *a compact, self-contained module housing having (1) an elongated front panel, and (2) a back panel spaced a desired distance from the front panel;*

(b) *at least four coaxial jacks mounted to the front panel at speed intervals in the elongated direction for separately receiving electrical plugs, such as patch cord plugs and looping plugs, and defining an input jack, an output jack, a cross-connect input jack, and a cross-connect output jack;*

(c) *at least four cable connectors mounted to the rear panel defining (1) an input connector normally connected through a coaxial cable to a signal input portion of one telecommunication apparatus, (2) an output connector normally connected through a coaxial cable to the signal output portion of the one telecommunication apparatus, (3) a cross-connect input connector normally connected through a coaxial cable to a signal input portion of a second telecommunication apparatus, and (4) a cross-connect output connector normally connected through a coaxial cable to a signal output portion of the second telecommunication apparatus;*

(d) *a coaxial input conductor extending between the front and back panels having one end permanently connected to the input jack and an opposite end permanently connected to the input connector;*

(e) *a coaxial output conductor extending between the front and back panels having one end permanently connected to the output jack and an opposite end permanently connected to the output connector;*

(f) *a coaxial cross-connect input conductor extending between the front and back panels having one end permanently connected to the cross-connect input jack and opposite end permanently connected to the cross-connect input connector;*

(g) *a coaxial cross-connect output conductor extending between the front and back panels having one end permanently connected to the cross-connect output jack and an opposite end permanently connected to the cross-connect output connector;*

(h) *an input jack switch mounted internally within the module housing, (1) for electrically bridging the input conductor and the cross-connect input conductor to interconnect the signal input portion of the first and second telecommunication apparatus, when a plug is absent from the input jack and the cross-connect input jack, and (2) for isolating the input conductor or the cross-connect input conductor from the other, when a plug is inserted into the respective jack;*

(i) *an output jack switch mounted internally within the module housing (1) for electrically bridging the output conductor and the cross-connect output conductor to interconnect the signal output portions of the first and second telecommunication apparatus, when a plug is absent from both the output jack and the cross-connect output jack, and (2) for isolating the output conductor or the cross-connect output conductor from the other, when a plug is inserted in the respective jack; and*

(j) *wherein the module has the cross-connect input jack located immediately adjacent the input jack.*

4. [In the digital telecommunication network as defined in claim 1] *In a digital telecommunication network having the capability of transmitting digital signals at speeds in excess of 40 million bites per second (Mbps), a digital signal cross-connect terminal unit having a plurality of digital cross-connect modules for interconnecting various digital telecommunication apparatus within the network and for providing a central access point for monitoring, testing, and temporarily reconnecting the various digital telecommunication apparatus; in which one or more of the modules in such terminal unit comprises:*

(a) *a compact, self-contained module housing having (1) an elongated front panel, and (2) a back panel spaced a desired distance from the front panel;*

(b) *at least four coaxial jacks mounted to the front panel at spaced intervals in the elongated direction for sepa-* rately receiving electrical plugs, such as patch cord plugs and looping plugs, and defining an input jack, an output jack a cross-connect input jack, and a cross-connect output jack;

(c) at least four coaxial cable connectors mounted to the rear panel defining (1) an input connector normally connected through a coaxial cable to a signal input portion of one telecommunication apparatus, (2) an output connector normally connected through a coaxial cable to the signal output portion of the one telecommunication apparatus, (3) a cross-connect input connector normally connected through a coaxial cable to the signal input portion of a second telecommunication apparatus, and (4) a cross-connect output connector normally connected through a coaxial cable to a signal output portion of the second telecommunication apparatus;

(d) a coaxial input conductor extending between the front and back panels having one end permanently connected to the input jack and an opposite end permanently connected to the input connector;

(e) a coaxial output conductor extending between the front and back panels having one end permanently connected to the output jack and an opposite end permanently connected to the output connector;

(f) a coaxial cross-connect input conductor extending between the front and back panels having one end permanently connected to the cross-connect input jack and opposite end permanently connected to the cross-connect input connector;

(g) a coaxial cross-connect output conductor extending between the front and back panels having one end permanently connected to the cross-connect output jack and an opposite end permanently connected to the cross-connect output connector;

(h) an input jack switch mounted internally within the module housing, (1) for electrically bridging the input conductor and the cross-connect input conductor to interconnect the signal input portion of the first and second telecommunication apparatus, when a plug is absent from both the input jack and the cross-connect input jack, and (2) for isolating the input conductor or the cross-connect input conductor from the other, when a plug is inserted into the respective jack;

(i) an output jack switch mounted internally within the module housing (1) for electrically bridging the output conductor and the cross-connect output conductor to interconnect the signal output portions of the first and second telecommunication apparatus, when a plug is absent from both the output jack and the cross-connect output jack, and (2) for isolating the output conductor or the cross-connect output conductor from the other, when a plug is inserted in the respective jack; and (j) wherein the module has the output jack immediately adjacent to the input jack *in the elongated direction* and spaced *an interval* distance sufficient to enable a looping plug to be inserted simultaneously into the input jack and the output jack to interconnect the input conductor and the output conductor at the front panel.

11. In the digital telecommunication network as defined in claim 2 wherein the module has the cross-connect input jack located immediately adjacent the input jack in the elongated direction.

12. In the digital telecommunication network as defined in claim 2 wherein the module has the output jack immediately adjacent to the input jack in the elongated direction and spaced an interval distance sufficient to enable a looping plug to be inserted simultaneously into the input jack and the output jack to interconnect the input conductor and the output conductor at the front panel.

13. In the digital telecommunication network as defined in claim 12 wherein the module has the cross-connect input jack positioned immediately adjacent the input jack in the elongated direction and has the cross-connect output jack positioned immediately adjacent to the output jack in the elongated direction and wherein each of the jacks, excluding the monitoring jacks, are evenly spaced in the elongated direction with respect to its adjacent jack.

14. In a digital telecommunication network having the capability of transmitting digital signals at speeds in excess of 40 million bites per second (Mbps), a digital signal cross-connect terminal unit having a plurality of digital cross-connect modules for interconnecting various digital telecommunication apparatus within the network and for providing a central access point for monitoring, testing, and temporarily reconnecting the various digital telecommunication apparatus; in which one or more of the modules in such terminal unit comprises:

(a) a compact, self-contained module housing having (1) an elongated front panel, and (2) a back panel spaced a desired distance from the front panel;

(b) at least four coaxial jacks mounted to the front panel at spaced intervals in the elongated direction for separately receiving electrical plugs, such as patch cord plugs and looping plugs, and defining an input jack, an output jack, a cross-connect input jack, and a cross-connect output jack;

(c) at least four coaxial cable connectors mounted to the rear panel defining (1) an input connector normally connected through a coaxial cable to a signal input portion of one telecommunication apparatus, (2) an output connector normally connected through a coaxial cable to the signal output portion of the one telecommunication apparatus, (3) a cross-connect input connector normally connected through a coaxial cable to a signal input portion of a second telecommunication apparatus, and (4) a cross-connect output connector normally connected through a coaxial cable to a signal output portion of the second telecommunication apparatus;

(d) a coaxial input conductor extending between the front and back panels having one end permanently connected to the input jack and an opposite end permanently connected to the input connector;

(e) a coaxial output conductor extending between the front and back panels having one end permanently connected to the output jack and an opposite end permanently connected to the output connector;

(f) a coaxial cross-connect input conductor extending between the front and back panels having one end permanently connected to the cross-connect input jack and opposite end permanently connected to the cross-connect input connector;

(g) a coaxial cross-connect output conductor extending between the front and back panels having one end permanently connected to the cross-connect output jack and an opposite end permanently connected to the cross-connect output connector;

(h) an input jack switch mounted internally within the module housing; (1) for electrically bridging the input conductor and the cross-connect input conductor to interconnect the signal input portion of the first and second telecommunication apparatus, when a plug is absent from both the input jack and the cross-connect input jack; and (2) for isolating the input conductor or the cross-connect input conductor from the other, when a plug is inserted into the respective jack; and (i) an output jack switch mounted internally within the module housing (1) for electrically bridging the output conductor and the cross-connect output conductor to interconnect the signal output portions of the first and second telecommunication apparatus, when a plug is absent from both the output jack and the cross-connect output jack; and (2) for isolating the output conductor or the cross-connect output conductor from the other, when a plug is inserted in the respective jack; and (j) wherein the module has the cross-connect input jack positioned immediately adjacent the input jack in the elongated direction and has the cross-connect output jack positioned immediately adjacent to the output jack in the elongated direction and wherein each of the jacks are evenly spaced with respect to its adjacent jack to enable a looping plug to be inserted simultaneously into the adjacent jacks to interconnect their respective conductors at the front panel.

* * * * *